United States Patent [19]

Ng

[11] Patent Number: 5,241,270
[45] Date of Patent: Aug. 31, 1993

US005241270A

[54] ELECTRONIC COMPASS USING HALL-EFFECT SENSORS

[76] Inventor: Kim Kwee Ng, Physics, Suny, Stony Brook, N.Y. 11794-3800

[21] Appl. No.: 692,798

[22] Filed: Apr. 29, 1991

Related U.S. Application Data

[63] Continuation-in-part of Ser. No. 503,033, Apr. 2, 1990, abandoned.

[51] Int. Cl.$^5$ .................. G01R 33/06; G01R 33/02; G01C 17/28; G01C 17/30
[52] U.S. Cl. .................................. 324/251; 324/247; 33/361
[58] Field of Search ............... 324/207.20, 251, 253, 324/226, 227, 330, 331, 345, 247; 33/355 R, 363 R, 361; 307/309; 340/870.35, 870.38; 338/32 R, 32 H; 73/178 R, 179

[56] References Cited

U.S. PATENT DOCUMENTS

| | | | |
|---|---|---|---|
| 3,197,880 | 8/1965 | Rice et al. | 324/251 X |
| 3,622,898 | 11/1971 | Salmon | 324/251 X |
| 3,906,641 | 9/1975 | Freeman | 324/251 X |
| 4,163,326 | 8/1979 | Edwards | 324/251 X |
| 4,373,271 | 2/1983 | Nitz | 324/251 X |
| 4,518,918 | 5/1985 | Avery | 324/207.20 |
| 4,656,750 | 4/1987 | Pitt et al. | 324/251 X |
| 4,692,702 | 9/1987 | Hüschelrath et al. | 324/251 |
| 4,737,710 | 4/1988 | Van Antwerp et al. | 324/207.20 |
| 4,857,842 | 8/1989 | Sturman et al. | 324/207.20 X |

Primary Examiner—Walter E. Snow

[57] ABSTRACT

A Hall effect device with appropriate electronic circuits can sense a very weak magnetic field and it is thus useful to be used as a compass. It can also be configured as two or more directional indicators as desired.

10 Claims, 3 Drawing Sheets

ELECTRONIC COMPASS USING HALL-EFFECT SENSORS

This application is a continuation-in-part of U.S. application Ser. No. 07/503,033 filed Apr. 2, 1990, now abandoned.

FIELD OF THE INVENTION

This invention is related to the direction sensing and more particularly to a non-mechanical electronic means using Hall-effect sensors for sensing and remotely displaying the directional orientation of a moving vehicle or the like with respect to the earth's magnetic field.

DESCRIPTION OF THE PRIOR ART

Many well known methods have been used for determining the direction of the magnetic field when the magnetic field has a strength in excess of about one Gauss. Since the strength of the earth's magnetic field is much less than one Gauss, other methods employing sensitive detectors must be used to sense and display directions. Some methods for sensing and displaying direction referenced to the earth's magnetic poles use devices which employ mechanical linkages which are bulky, complicated and difficult to make portable. For use in a moving vehicle, it is desirable to have a direction indicating device that is capable of sensing the direction and electronically transmitting it for remote display. The sensor of such a device must be of a size and weight such that it can be mounted conveniently at a location free from any magnetic field associated with the vehicle. In this regard, Hall-effect sensors have been used in certain devices of the prior art because they possess the desired advantages of small size and low weight, being easily miniaturized and capable of generating an electrical signal for remote transmission.

In the invention of U.S. Pat. Nos. 4,163,326 and 3,197,880, which both use Hall-effect sensors for detection of the earth's magnetic field, the Hall-effect sensors are energized by an electrical current having a sinusoidal waveform. The output signal from the Hall-effect sensors has an output waveform which is also sinusoidal. Vehicle directional heading is determined by the magnitude of the phase displacement of the output signal when compared to a reference signal. Use of this phase shift technique requires circuitry and components that are complicated, expensive to construct and difficult to maintain. Stability of all the phase shift measurement becomes meaningless if there is any significant instability.

It is thus an object of this invention to provide a stable device using Hall-effect sensors for sensing and remote display, which device does not rely upon phase difference measurement and which can be assembled readily from inexpensive components that are regular items of commerce. Another object of this invention is to provide a reliable simple means for sensing the direction of a moving vehicle and electronically displaying the directional heading with respect to the earth's magnetic poles using direct-current energized Hall-effect sensors as detectors. A still further object of this invention is to provide an electronic direction sensing device with improved stability and reliability without sacrifice of sensitivity.

SUMMARY OF THE INVENTION

The invention utilizes the well known fact that when a Hall-effect voltage is developed across a Hall-effect sensor in a direction that is perpendicular to both the direction of flow of the energizing current and the direction of the magnetic field, and that the magnitude and the sense of the Hall-effect voltage output is a function of the relative alignment of the Hall-effect sensor with the magnetic field. Thus, if a first extended planar face of a Hall-effect sensor is aligned substantially perpendicularly with respect to a magnetic field, a first voltage of a first magnitude and a first sense is measurable. If the Hall-effect sensor is then rotated through an arc of a circle around an axis extending in a direction that is both normal to the magnetic field and normal to the direction of flow of the energizing current, it is observed that the magnitude of the resulting Hall-effect voltage output initially decreases in a regular manner to minimum at ninety degrees of rotation where the first extended planar face is aligned substantially parallel with respect to the magnetic field. Upon further rotation in the same direction the sense of the Hall-effect voltage changes from the first sense to the opposite sense as its magnitude increases to attain a maximum at one-hundred and eighty degrees of rotation. Those skilled in the art will appreciate that the magnitude and sense of the Hall-effect voltage, when properly interpreted, together provide sufficient information to allow for at least a first approximation of a directional heading.

Instead of using only one Hall-effect sensor, I employ an array of at least two substantially identical Hall-effect sensors aligned in the same direction in either a coplanar or a parallel configuration and electrically coupled with each Hall-effect voltage coupled in series so as to yield a difference Hall-effect voltage in a magnetic field. By difference voltage, I mean two voltages of opposite sense: a first voltage at a first terminal having a first magnitude and a first sense; and a second voltage at a second terminal having a second magnitude and the opposite sense. The first magnitude and the second magnitude are nearly equal. It should be understood that an array may be prealigned such that a maximum magnitude signal of a preselected polarity is produced when the device is aligned to a preselected heading, and a plurality of arrays may be used with each array prealigned for its preselected heading. Thus, in a device of my invention wherein only one array is used, I can discriminate and determine whether the heading is a preselected one of the two cardinal points of the compass or its one-hundred and eighty degrees complement. With a device of my invention wherein two arrays are used, I can discriminate and determine whether the heading is a preselected one of eight points of the compass. As the number of appropriately aligned arrays is increased the resolution of the directional heading is improved.

Associated with each array are operational amplifiers to amplify the Hall-effect difference voltage and then to amplify separately the voltage of each polarity of the amplified Hall-effect difference voltage. This processing yields two analog signals, each signal a measure of the amplified voltage of each polarity. The correct polarity of the voltage having the equal or greater magnitude is determinative of the heading of the device with respect to the earth's magnetic field.

The analog signal voltages of each polarity are processed to select that one of the voltages having the equal or greater magnitude, provided that the magnitude is above a preselected threshold voltage. A logic circuit, responsive to the polarity of the analog signal voltage having the equal or greater magnitude, controls analog to digital conversion and storage of the informational content of the digital signal in a buffer.

It should be understood that, depending upon the precision of the directional discrimination desired, each array must have associated therewith the described amplifiers and largest voltage sensing circuitry in order to load the buffer. Each Hall-effect sensor array is powered from a common source which produces chopped direct current, which chopped direct current also provides timing pulses for synchronization of the periodic sensing and periodic loading of the buffer as well as synchronization of the periodic sampling of the buffer contents and the display of the directional information contained therein.

Display drivers and decoders, known in the art, are used to drive the display elements according to the buffer content and to display the direction in visually recognizable form.

The chopped direct current is produced by a square-wave free-running oscillator. Use of the chopped direct current reduces long-term drift in the circuits, especially in the Hall-effect voltage arrays.

DESCRIPTION OF THE PREFERRED EMBODIMENT

Although a single Hall-effect sensor will develop a voltage output when energized in the presence of a magnetic field, a single Hall-effect sensor is usually insufficient to produce a useful stable voltage responsive to the earth's magnetic field because the earth's magnetic field is not strong and a single Hall-effect sensor is affected by electrical noise and is subject to drift phenomena and temperature variation effect. For these reasons, in my invention, I use an array of at least two Hall-effect sensors to sense the magnetic field direction.

How the signals from the Hall-effect sensor array are processed to result in a visible output indicative of vehicle heading and a more complete understanding of the construction and operation of my invention will become apparent from this description when taken together with the accompanying drawing, wherein like reference symbols refer to like elements of the invention.

Figure 1:
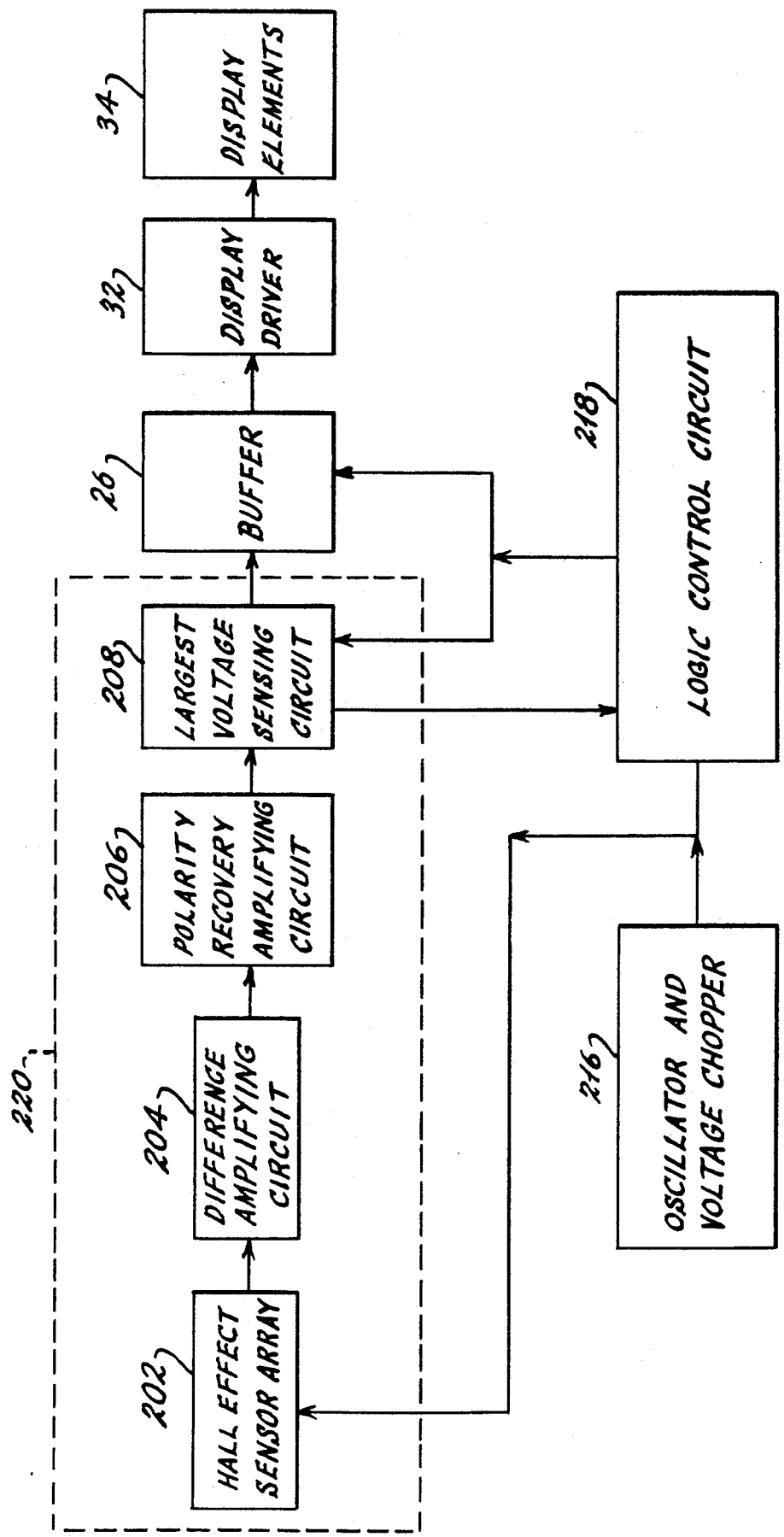
FIG. 1 is a simplified block diagram of a preferred embodiment of an electronic compass of the invention using Hall-effect sensors with associated electronic circuits.

Referring now to FIG. 1 of the drawing, a first sensor array 202, comprising a plurality of Hall-effect sensors, with all of the Hall-effect sensors physically aligned in parallel and electrically coupled with their output voltages in series, defines a means for generating a first voltage of a first polarity at a first terminal and a second voltage of the opposite polarity at a second terminal. Said first terminal and said second terminal each coupled to provide an input to a difference amplifying circuit means 204 for combining said first voltage and said second voltage to produce an amplified difference voltage. Difference amplifying circuit means 204 comprises a difference operational amplifier which amplifies the difference between the first voltage and the second voltage output signals from Hall-effect sensor array 202. The series connection of the Hall-effect sensors in array 202 and the amplification of the voltage difference combine to minimize effects caused by temperature change and variation in power supply voltage and eliminates the need for reference voltages and the like requiring circuits of extremely high stability and delicacy.

The gain of the difference amplifying circuit means 204 is preselected to yield suitable input to polarity recovery amplifying circuit means 206 for obtaining from the amplified difference voltage a first analog output signal of original polarity and a second analog output signal of opposite polarity. Output of polarity recovery amplifying circuit means 206, comprising an inverting operational amplifier and a non-inverting operational amplifier, is in effect the greatly amplified analog of the original output from the first terminal and the second terminal of Hall-effect sensor array 202.

Each output signal from polarity recovery amplifying circuit means 206 is processed by largest voltage sensing circuit means 208 for processing a first analog output signal of original polarity and a second analog output signal of opposite polarity to sense the one analog ouput signal having the greatest magnitude. Only the analog output signal of correct polarity having the equal or greater magnitude is processed to yield a digital signal which is stored in buffer means 26 for storage and retrieval of digital data. Logic control circuit means 218 for controlling information transit to and from buffer means 26 programs the input of digital data to and the output of digital data from buffer means 26. Logic control circuit means 218 is coupled to receive input from largest voltage sensing circuit 208 and to deliver output to largest voltage sensing circuit means 208 for activation thereof and for transfer of the digital signal corresponding to the analog output signal having the correct polarity and the equal or greater magnitude to buffer means 26. Oscillator and voltage chopper means 216 for generating a periodic square-wave direct-current pulse having preselected timing characteristics provides timing clock input to logic control circuit means 218 and also energizes the Hall-effect sensors in Hall-effect sensor array 202. Thus, during a single pulse from oscillator and voltage chopper means 216, Hall-effect sensor array 202 is energized, its output signal are amplified by difference amplifying circuit means 204 and polarity recovery amplifying circuit means 206 and fed to largest voltage sensing circuit means 208 for processing.

The polarity of the analog output signal having the equal or greater magnitude determines whether Hall-effect sensor array 202 is facing in a direction that is within an acceptable preselected angle of its preselected compass heading or is facing in the opposite direction, provided of course that the magnitude of the analog output signal exceeds a value preselected to establish the sensitivity level of directional discrimination. The criteria for the greater magnitude of the output signals will become apparent when a second sensor array is added later on. Digital data indicative of the polarity of the analog output signal having the equal or greater magnitude is stored in buffer means 26 and is refreshed after each pulse from oscillator and voltage chopper means 216. Following each pulse, the digital data stored in buffer means 26 is processed by conventional means for remotely transmitting, decoding and displaying such data, as by display drivers 32 and display elements 34, known in the art and which are more fully described in U.S. Pat. No. 4,163,326.

The dash-line block 220 in FIG. 1 comprising of the means 202, 204, 206, 208 is a complete set of electronic circuits for the first sensor array 202. The dash-line block 220 can be repeated for an additional set of sensor array. When the second sensor array is used, it produces a third voltage from a third terminal and a fourth voltage from a fourth terminal. These output analog signals are similarly processed by the difference amplifying circuit, polarity recovery amplifying circuit and the largest voltage sensing circuit as described earlier.

If the second sensor array is positioned perpendicular to the first sensor array, the resolution of the directional heading increases. Such a device of two sensor arrays could indicate up to eight cardinal points of the compass, these include the intermediate values between the four known major cardinal points of the compass. The intermediate values exist when the Hall-effect sensors produce output signals of equal magnitude having the correct polarity for processing as described above.

Figure 2:
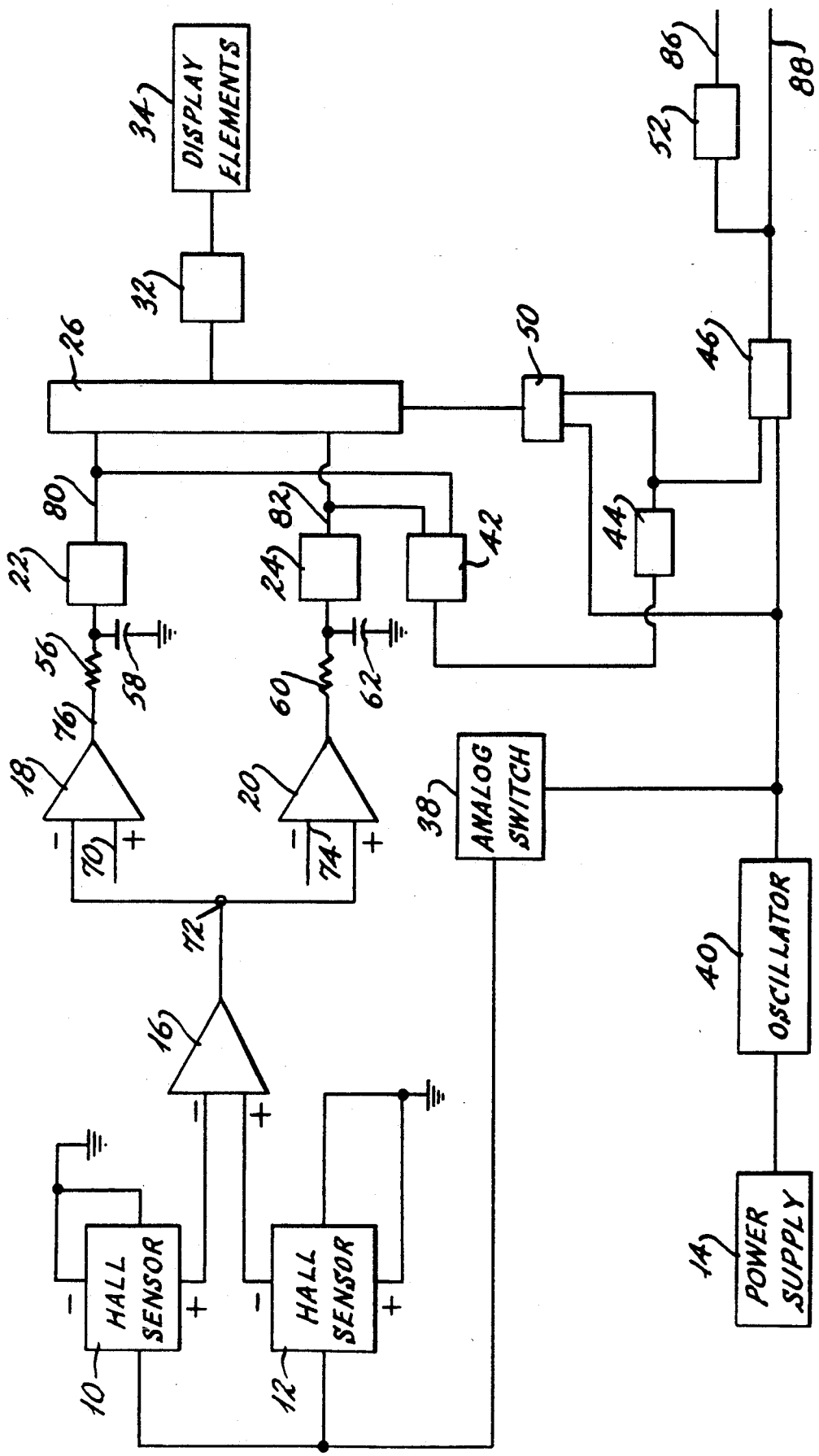
FIG. 2 is a simplified circuit diagram of a preferred embodiment of the invention for displaying a preselected single directional heading or its complement wherein the largest analog signal voltage is selected using a resistor-capacitor timing circuit.

Referring now to FIG. 2 of the drawing, wherein the components comprising FIG. 1 of the drawing are shown in more detail, the Hall-effect sensor array 202 of FIG. 1, comprising Hall-effect sensor 10 and Hall-effect sensor 12 is direct coupled as shown with output voltages in opposition. A compensating off-set voltage circuit, not shown, comprising an operational amplifier may be provided to adjust the output of sensor 10 and sensor 12 so that the output voltage from each sensor is substantially identical when both sensors are positioned with their active faces in parallel to a magnetic field. As is well known in the art, the sensitivity of each sensor can be increased to about 1 millivolt per Gauss using amplifying circuits. It should be understood that sensor 10 and sensor 12 are electrically coupled in series and physically arranged with like faces oriented in the same directional sense as illustrated more clearly in FIG. 3.

Figure 3:
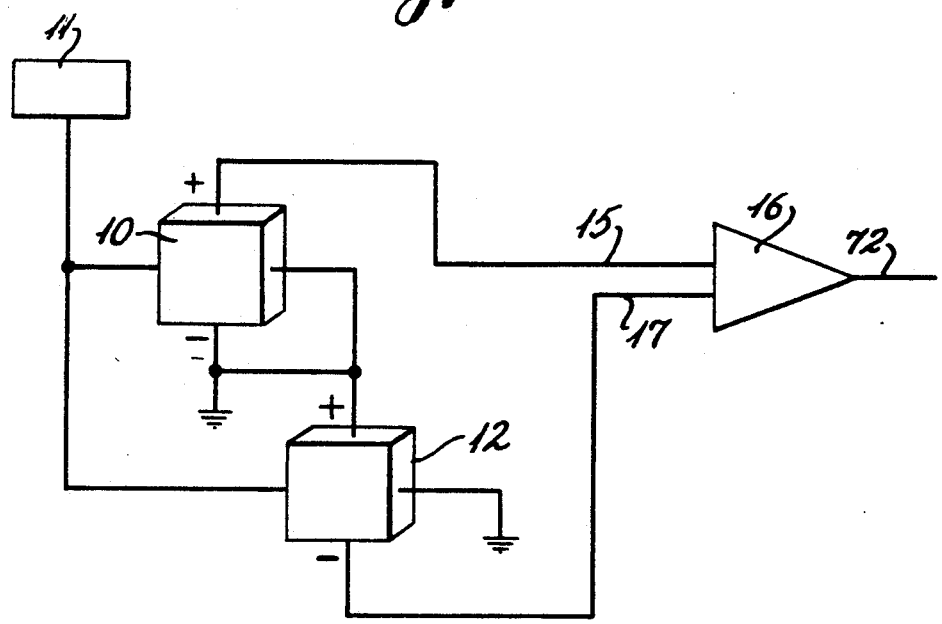
FIG. 3 is a simplified circuit diagrammatic isometric view of a preferred embodiment of an array of Hall-effect sensors of this invention wherein two sensors are physically aligned in parallel.

In FIG. 3, a first voltage of positive polarity is generated at terminal 15 and a second voltage of negative polarity is generated at terminal 17, when the array comprising sensor 10 and sensor 12 is positioned perpendicular to a magnetic field. The difference amplifying circuit means 204 of FIG. 1 is shown here as difference operational amplifier 16 which amplifies the difference in the Hall voltages generated in each sensor in a magnetic field when an electrical current from direct current supply 11 energizes each Hall-effect sensor 10 and sensor 12. Difference operational amplifier 16's output signal 72 will show a noticeable voltage difference of more than ten millivolts when the array comprising sensor 10 and sensor 12 is rotated around the vertical axis.

Referring again to FIG. 2, polarity recovery amplifying circuit means 206 of FIG. 1 is shown as comprising inverting operational amplifier 18 and non-inverting operational amplifier 20. In the circuit as shown, the polarity of the output signal 72 from difference operational amplifier 16 determines which one of operational amplifier 18 and operational amplifier 20 provides a signal at largest voltage sensing circuit means 208 of FIG. 1.

In the circuit of FIG. 2, largest voltage sensing circuit means 208 of FIG. 1 is shown as a resistor-capacitor timing circuit for each operational amplifier 18 and operational amplifier 20. Thus, the circuit components associated with operational amplifier 18 include resistor 56, capacitor 58 and timer 22, whereas the operational amplifier 20 charges capacitor 62 via resistor 60 and discharging through timer 24. Output voltage 76 from operational amplifier 18 charges capacitor 58 until the voltage reaches a preselected threshold voltage set by timer 22. At the preselected threshold voltage, timer 22 produces an output signal at 80. Similarly, timer 24 produces an output signal at 82. Timer 22 and timer 24 are substantially identical commercially available timers having the generic name 555. Such a timer identified as NE555 is available from the National Semiconductor Company and SN52555 from the Texas Instruments Incorporated.

It should be understood that whichever analog voltage has the greater magnitude will be the first to charge its capacitor to the preselected threshold voltage and produces its output signal. Whichever output signal is first available, output signal at 80 or output signal at 82, enters NAND gate 42, triggering monostable multivibrator 44 which emits a short square wave pulse after being triggered. The termination of the square wave pulse from monostable multivibrator 44 activates monostable multivibrator 48 which transmits a signal via line 88 to timer 22 and timer 24 enabling a discharging circuit inside timer 22 and timer 24 to discharge both capacitor 58 and capacitor 62. Monostable multivibrator 52 is activated by the signal from monostable multivibrator 48 to produce a pulse of short duration via line 86 to reset both timer 22 and timer 24 after discharge of capacitor 58 and capacitor 62 to allow the recharging of capacitor 58 and capacitor 62. The period of each monostable multivibrator is selected to be very short when compared to the time constant of the resistor-capacitor associated with each timer.

Square wave free-running oscillator 40 provides timing signals through monostable multivibrator 48 and monostable multivibrator 52 to timer 22 and timer 24 to initiate a new cycle of determination of the maximum voltage at terminal 76 and 78. Square wave free-running oscillator 40 also drives an analog switch 38 to act as a voltage chopper providing chopped direct current to each Hall-effect sensor 10 and Hall-effect sensor 12. Buffer 26 is activated only by the signal from monostable multivibrator 44 during active-time state of oscillator 40 through NOR gate 50. The duration of the active-time state of oscillator 40 is selected such that during the active-time state of oscillator 40 the state of timer 22 and timer 24 is reset by monostable multivibrator 48 and monostable multivibrator 52, and one of capacitor 58 and capacitor 62 has sufficient time to charge to voltage sufficient to activate one of timer 22 and timer 24, so as to produce output signal 80 and output signal 82 when sensor 10 and sensor 12 are both perpendicular to the earth's magnetic field.

A suitable period for oscillator 40 is about one second with an active-time state of about forty milliseconds. Reference voltage 70 required for proper function of operational amplifier 18 and reference voltage 74 required for proper function of operational amplifier 20 is supplied from a conventional constant voltage source, not shown. The power supply 14 can be a conventional direct current voltage source.

Conventional circuits are used for display drivers 32 which activate conventional display elements 34 according to the content of the buffer 26 as is well known and described in the art in U.S. Pat. No. 4,163,326.

It has been shown that the resistor-capacitor timing circuit can be used for the largest voltage sensing circuit means 208. There are other analog methods and digital methods for determining the largest magnitude of the voltage signals. The resistor-capacitor method mentioned above is based on the fact that the voltage signal of larger amplitude will take less time to charge up a capacitor to a certain voltage level. As a result, this voltage level can be selected as a threshold voltage to trigger one of timers, whereby a digital signal is generated for storage and subsequent display, while simultaneously blocking any smaller voltages from triggering other timers.

There are other methods for the largest voltage sensing circuit means 208. For example, one uses a voltage comparator. It triggers the voltage comparator only if the input signal reaches a certain voltage level. However, its usage is restricted as the sensor array's sensing faces may not necessarily lie in a vertical plane, thus it may not produce large enough voltage to trigger the voltage comparator.

The other analog method uses a voltage comparator, where reference threshold voltage is controlled by a voltage generator whose magnitude decreases with time during an oscillator cycle. Therefore, the output from the voltage comparator changes only if the input signal exceeds the reference threshold voltage, this happens first for the input signal that has the largest voltage amplitude.

There are digital methods for the largest voltage sensing circuit 208. The first method is a direct comparison method. It uses a voltage comparator to decide which one of the two voltage signals has the larger amplitude, then the larger voltage signal is used to compare with a third voltage signal by using another comparator, the process continues until the largest voltage signal is found. The second digital method is a digitization method, in which the voltage amplitude is digitized and converted into a binary code. A computerised circuit is then used to process and analyze all the binary codes and decides which one has the largest voltage amplitude and drives the display to indicate the direction.

Figure 4:
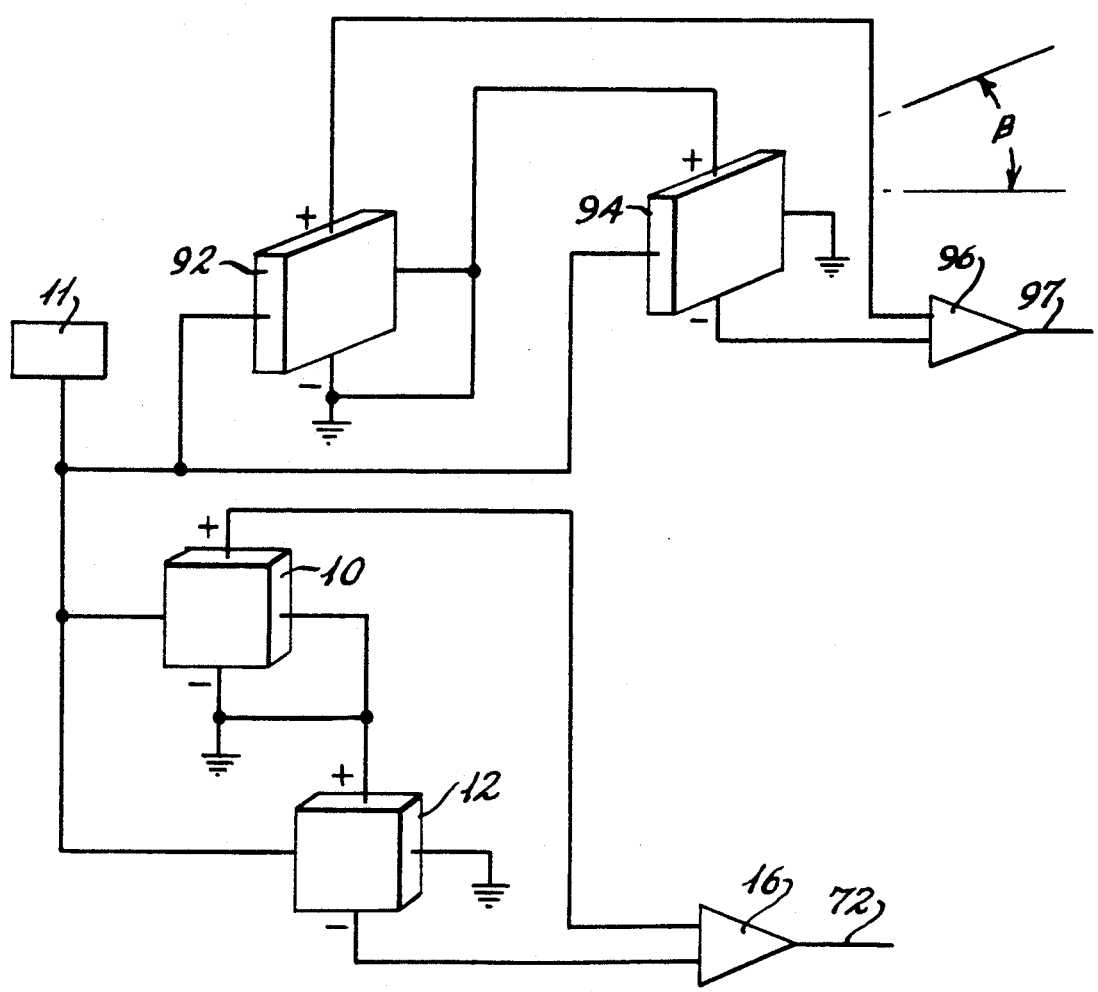
FIG. 4 is a simplified circuit diagrammatic isometric view of a preferred embodiment of two arrays of Hall-effect sensors of this invention wherein the arrays are physically aligned at an angle of $\theta$.

An array of Hall-effect sensors 202 will have its maximum voltage output when its sensing face is perpendicular to the earth's magnetic field. If only the maximum voltage is used for direction sensing, the device is only capable of recognizing North or South. FIG. 4 shows apparatus, comprising two sensor arrays with one of the sensor arrays positioned at an angle $\theta$ to the other array, capable for recognizing the cardinal points of the compass and their intermediate points. Each Hall sensor array has associated therewith difference amplifier. Difference amplifier 16 has an output signal 72 dependent upon the relative alignment with the earth's magnetic field of the array comprising sensor 10 and sensor 12. In a like manner, the output signal 97 from difference amplifier 96 depends upon the alignment of the array comprising sensor 92 and sensor 94 at an angle $\theta$ to the alignment of the array comprising sensor 10 and sensor 12. Therefore, with the use of two Hall sensor arrays, any of eight different directions are recognized when each output signal 72 and output signal 97 is processed as previously described. The outputs from the largest voltage sensing circuit means 208 of FIG. 1 go to the logic control circuit 218 and the buffer 26. Referring again to FIG. 2, the number of logic inputs to NAND gate 42 and to buffer 26 can thus be increased accordingly when additional sensor array is added. Therefore, as previously described, the elements in a dash-line block 220 can be replicated for improved resolution as shown in FIG. 1.

Having described the invention and its preferred mode of operation in sufficient detail for those of normal skill in the art to practice the same, it will be obvious to such practitioners to make certain changes and variation in the specific elements for the disclosed embodiments without departing from the scope of the invention. For this reason, the scope of the invention should not be limited by that which has been illustrated herein but should be limited only by the scope of the appended claims.

I claim:

1. An electronic compass for detecting and remotely displaying directional information with respect to the earth's magnetic poles, said compass comprising:
    means, employing at least two direct-current, Hall-effect sensors in an array, for generating a first voltage at a first terminal and a second voltage of opposite polarity at a second terminal;
    difference amplifying circuit means for combining said first voltage and said second voltage to produce an amplified difference voltage;
    polarity recovery amplifying circuit means for obtaining from said difference voltage a first analog output signal of original polarity and a second analog output signal of opposite polarity;
    largest voltage sensing circuit means for processing said first analog output signal and said second analog output signal into a retrievable data form suitable for storage; buffer means for storage of said data;
    logic control circuit means for controlling input and output said data to and from said buffer means and for resetting said largest voltage sensing circuit means;
    oscillator and voltage chopper means for generating a periodic direct current square wave signal adaptable as a timing signal during periodic updating, refreshing and readout of said data in said buffer means; and for powering said array at regular intervals, and,
    means for remotely transmitting, decoding and displaying said data, whereby the said directional heading is presented to a person in visually recognizable form.

2. The apparatus of claim 1 wherein the said array comprises a plurality of planar Hall-effect sensing elements, each of said elements having a magnetic sensing planar face arranged in the same directional sense.

3. The apparatus of claim 2 wherein the said magnetic sensing planar face of each of said elements in said array lies on a common plane.

4. The apparatus of claim 2 wherein at least one additional said array is arranged in a different directional sense so as to produce a third output voltage at a third terminal and a fourth output voltage of opposite polarity at a fourth terminal and each said additional said array has associated therewith a means for combining the said voltages from each said terminal to produce a said amplified difference voltage.

5. The apparatus of claim 1, wherein said polarity recovery amplifying circuit means comprises an inverting operational amplifier and a noninverting operational amplifier.

6. The apparatus of claim 5, wherein said largest voltage sensing circuit means coupled to each said operational amplifier comprises, a capacitor receiving charging current from the said operational amplifier through a resistor, a discharging circuit for dissipating charge from said capacitor, a timer for generating an output signal when the voltage across the capacitor exceeds a preselected voltage level.

7. The apparatus of claim 5, wherein said largest voltage sensing circuit means coupled to each said operational amplifier, comprises a voltage comparator means for comparing output signal from said operational amplifier with a preselected threshold voltage.

8. The apparatus of claim 5, wherein said largest voltage sensing circuit means coupled to for each said operational amplifier, comprises a voltage comparator means for comparing output signal from said operational amplifier with a reference threshold voltage whose magnitude decreases with time, and a voltage generator means for generating said reference threshold voltage.

9. The apparatus of claim 1, wherein said logic control circuit means comprises a NAND gate means for processing the signals from the said largest voltage sensing circuit means, a first monostable multivibrator means for enabling the said buffer means when the said NAND gate means changes its state, a second monostable multivibrator means, activated by the said first monostable multivibrator means for producing a pluse to reset the said largest voltage sensing circuit means, a third monostable multivibrator means, activated by the said second monostable multivibrator means for returning the largest voltage sensing circuit means to its original state for another new cycle of directional determination, and a NOR gate means controlled by said oscillator means and the said first monostable multivibrator for enabling the said buffer.

10. The apparatus of claim 1, wherein said largest voltage sensing circuit means comprises an analog to digital conversion and digital logic processing circuit for determining the largest of the voltage signals produced from the said operational amplifiers.

* * * * *